United States Patent
Iliopoulos et al.

(10) Patent No.: US 8,524,022 B2
(45) Date of Patent: Sep. 3, 2013

(54) METHOD OF MANUFACTURING A STRUCTURE

(75) Inventors: Alex Iliopoulos, Bristol (GB); John Flood, Bristol (GB)

(73) Assignee: Airbus Operations Limited, Bristol (GB)

( * ) Notice: Subject to any disclaimer, the term of this patent is extended or adjusted under 35 U.S.C. 154(b) by 358 days.

(21) Appl. No.: 12/821,718

(22) Filed: Jun. 23, 2010

(65) Prior Publication Data
US 2010/0327114 A1 Dec. 30, 2010

(30) Foreign Application Priority Data

Jun. 25, 2009 (GB) .................................. 0910938.0

(51) Int. Cl.
*B32B 41/00* (2006.01)

(52) U.S. Cl.
USPC ............... 156/64; 156/378; 156/379; 244/89; 244/123.1; 244/132; 244/211; 244/212; 244/213; 244/216

(58) Field of Classification Search
USPC ................ 244/89, 123.1, 132, 216, 211, 212, 244/213; 156/64, 378, 379
See application file for complete search history.

(56) References Cited

U.S. PATENT DOCUMENTS

| | | | |
|---|---|---|---|
| 4,565,595 A | 1/1986 | Whitener | |
| 6,749,155 B2 | 6/2004 | Bergmann | |
| 7,682,682 B2 | 3/2010 | Leon-Dufour et al. | |
| 2008/0258008 A1* | 10/2008 | Cooper | 244/131 |
| 2010/0136309 A1* | 6/2010 | Normand et al. | 428/213 |

FOREIGN PATENT DOCUMENTS

| | | |
|---|---|---|
| EP | 1745914 A2 | 1/2007 |
| EP | 1857359 A2 | 11/2007 |
| GB | 2458337 A | 9/2009 |
| JP | 2004196157 A | 7/2004 |
| WO | 2008099097 A2 | 8/2008 |

OTHER PUBLICATIONS

British Search Report for GB0910938.0 dated Nov. 20, 2009.

* cited by examiner

*Primary Examiner* — Katarzyna Wyrozebski Lee
*Assistant Examiner* — Joshel Rivera
(74) *Attorney, Agent, or Firm* — Lowe Hauptman & Berner, LLP

(57) ABSTRACT

A method of manufacturing a structure, the method comprising: forming a panel assembly by bonding a stack of thickness control plies of composite material to a laminar composite panel, the stack of thickness control plies having a first edge proximate an edge of the laminar composite panel, a second edge opposite the first edge, and a ramp where the thickness of the stack of thickness control plies decreases towards the first or second edge; measuring the thickness of the laminate composite panel or the panel assembly; controlling the number of thickness control plies in accordance with the measured thickness; attaching a first component to the panel assembly, the first component having a surface which engages the laminar composite panel and a ramp which engages the ramp in the stack of thickness control plies; and attaching the laminar composite panel at or near its edge to a further component.

8 Claims, 6 Drawing Sheets

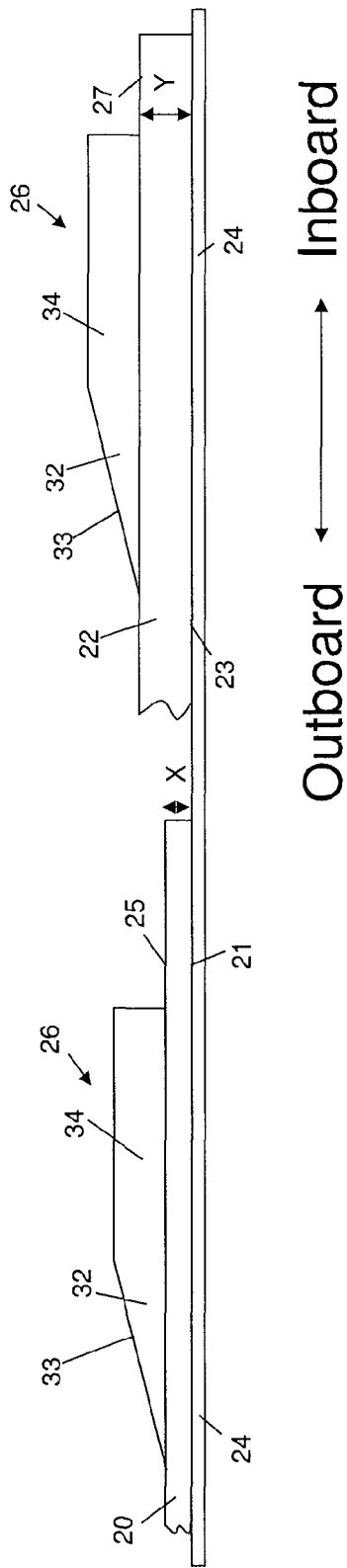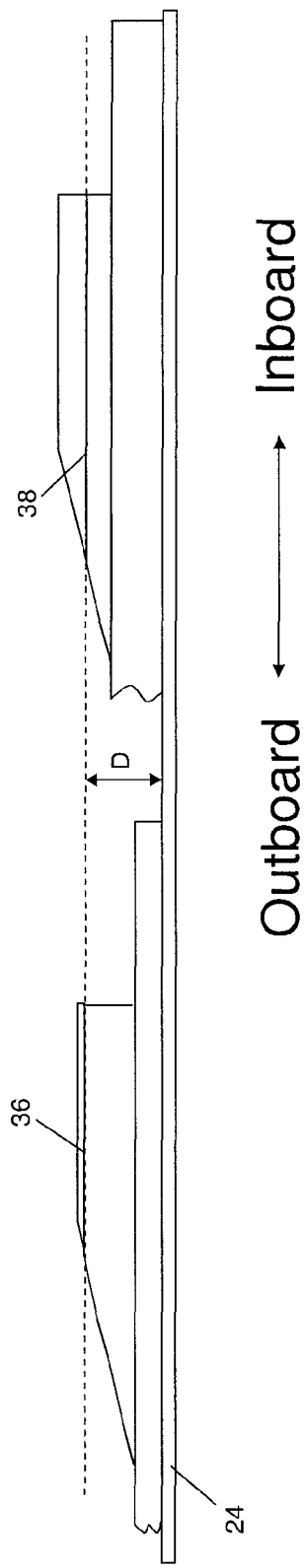

METHOD OF MANUFACTURING A STRUCTURE

RELATED APPLICATION

The present application is based on, and claims priority from, British Application Number 0910938.0, filed Jun. 25, 2009, the disclosure of which is hereby incorporated by reference herein in its entirety.

FIELD OF THE INVENTION

The present invention relates to a method of manufacturing a structure in which a laminar composite panel is attached to a first component, and the laminar composite panel is attached to a further component after it has been attached to the first component. By way of non-limiting example the panel may be a cover of an aircraft wing, the first component may be a spar of the wing, and the further component may be a centre wing box.

BACKGROUND OF THE INVENTION

FIG. 1 is a schematic cross sectional view of an aircraft wing root joint comprising an aircraft wing box 1 attached to a centre wing box 10. The centre wing box 10 comprises a rib 11 connecting upper and lower root joint fittings 2, 3. The aircraft wing box 1 comprises upper and lower laminar composite covers 4, 5 connected by a spar 6 which extends between them.

The covers 4, 5 have inner and outer mould lines 4a, 5a, 4b, 5b. The outer mould lines 4b, 5b form external aerodynamic surfaces of the wing box 1, while the inner mould lines 4a, 5a, form internal surfaces of the wing box 1 opposite the outer mould lines 4b, 5b.

The spar 6 is shown in longitudinal section in FIG. 1. The spar 6 is C-shaped in transverse section with upper and lower spar flanges 7, 8 which extend from a web 9 and engage the inner mould lines 4a, 5a of the covers 4, 5. The spar flanges 7, 8 terminate outboard of the inboard edge of the spar web 9 to leave spar flange cutback areas where the covers 4, 5 overhang the flanges 7, 8 in an inboard span-wise direction towards the root joint fittings 2, 3.

A problem with manufacturing such a joint is that the thickness of the laminar composite covers 4, 5 cannot be controlled accurately due to the method of manufacturing the laminate and the properties of the composite material. As a result the covers 4, 5 may not precisely meet the root joint fittings 2, 3 resulting in either a gap or a clash. This problem can be solved by bending the covers 4, 5 (where they overhang the spar flanges 7, 8) either towards the fittings (to close a gap) or away from the fittings (to avoid a clash). However this will induce stress in the covers 4, 5 and as a result the covers must be made thicker and heavier to cope with this stress. Also it may be difficult to bend the covers sufficiently, particularly near the cover/spar interface shown in FIG. 1.

The thickness of the upper cover 4 (i.e. the distance between the inner mould line 4a and the outer mould line 4b) is particularly critical as it is its outer mould line 4b (rather than its inner mould line 4a) which engages the root joint fitting 2. Clearly, any increase or decrease in the thickness of the upper cover 4 will affect the alignment between the upper cover 4 and the upper root joint fitting 2 and/or the alignment between the lower cover 5 and the lower root joint fitting 3. Conversely, as it is the inner mould line 5a of the lower cover 5 which engages the lower root joint fitting 3 (rather than its outer mould line 5b), the thickness of the lower cover does not affect the alignment between the lower root joint fitting 3 and the lower cover 5, nor does the thickness of the lower cover affect the alignment between the upper cover 4 and the upper root joint fitting 2. However, the thickness of the lower cover is critical for the attachment of a buttstrap 12 which connects the lower cover OML 5b to a lower cover 13 of the centre wing box 10. Therefore, any thickness variation in the manufacturing process of both covers must be carefully managed.

SUMMARY OF THE INVENTION

A first aspect of the invention provides a method of manufacturing a structure, the method comprising
  a) forming a panel assembly by bonding a stack of thickness control plies of composite material to a laminar composite panel, the stack of thickness control plies having a first edge proximate an edge of the laminar composite panel, a second edge opposite the first edge, and a ramp where the thickness of the stack of thickness control plies decreases towards the first or second edge;
  b) measuring the thickness of the laminate composite panel or the panel assembly;
  c) controlling the number of thickness control plies in accordance with the measured thickness;
  d) attaching a first component to the panel assembly, the first component having a surface which engages the laminar composite panel and a ramp which engages the ramp in the stack of thickness control plies; and
  e) attaching the laminar composite panel at or near its edge to a further component.

The various steps of the method may be performed in any order, and indeed some of the steps (for instance steps a), d) and e)) may be performed at the same time, but preferably step e) is performed after step d).

A second aspect of the invention provides a structure comprising:
  a panel assembly comprising a stack of thickness control plies of composite material bonded to a laminar composite panel, the stack of thickness control plies having a first edge proximate an edge of the laminar composite panel, a second edge opposite the first edge, and a ramp where the thickness of the stack of thickness control plies decreases towards the first or second edge;
  a first component attached to the panel assembly, the first component having a surface which engages the laminar composite panel and a ramp which engages the ramp in the stack of thickness control plies; and
  a further component attached to the laminar composite panel at or near its edge.

The laminar composite panel may be attached at or near its edge to the further component by an overlapping joint, a butt joint, or any other suitable connection.

Typically a longest one of the thickness control plies extends along only part of a length of the laminar composite panel, preferably less than 50% of its length.

Preferably the thickness of the stack of thickness control plies decreases towards the second edge.

In the event that the laminate composite panel is too thick or thin, then it may be bent to form a ramp after step c). The ramp may be inclined in the opposite sense to the ramp in the stack of thickness control plies, or in the same sense.

Typically at least some of the plies of the laminar composite panel are made from Carbon Fibre Reinforced Plastic (CFRP), although other composite materials may be envisaged such as Glass-Fibre Reinforced Plastic.

Further preferred features of the present invention are set out in the dependent claims.

In the embodiment of the invention described the further component is a centre wing box of an aircraft wing, the first component is a spar of an aircraft wing and the panel assembly is an aircraft wing cover assembly. However the invention is applicable to a variety of other joints. For instance the further component may be an aircraft fuselage skin panel, the first component may be a frame of an aircraft fuselage, and the panel assembly may be an aircraft fuselage skin panel assembly which is attached to the first component by a butt-strap.

BRIEF DESCRIPTION OF THE DRAWINGS

Embodiments of the invention will now be described with reference to the accompanying drawings, in which:

FIGS. 2 and 3 illustrate a method of managing the thickness of a composite panel;

DETAILED DESCRIPTION OF EMBODIMENT(S)

FIGS. 2a and 2b show a pair of partially cured Carbon Fibre Reinforced Plastic (CFRP) aircraft wing covers 20, 22 on a mould tool 24. The covers 20, 22 have outer mould lines (OMLs) 21, 23, which engage the mould tool 24, and non-moulded inner mould lines (IMLs) 25, 27 opposite the outer mould lines 21, 23. The covers are moulded by laying a vacuum bag (not shown) over the IMLs, applying a vacuum between the vacuum bag and the covers to press the covers against the mould tool 24, and heating the covers to cure them.

Figure 1:
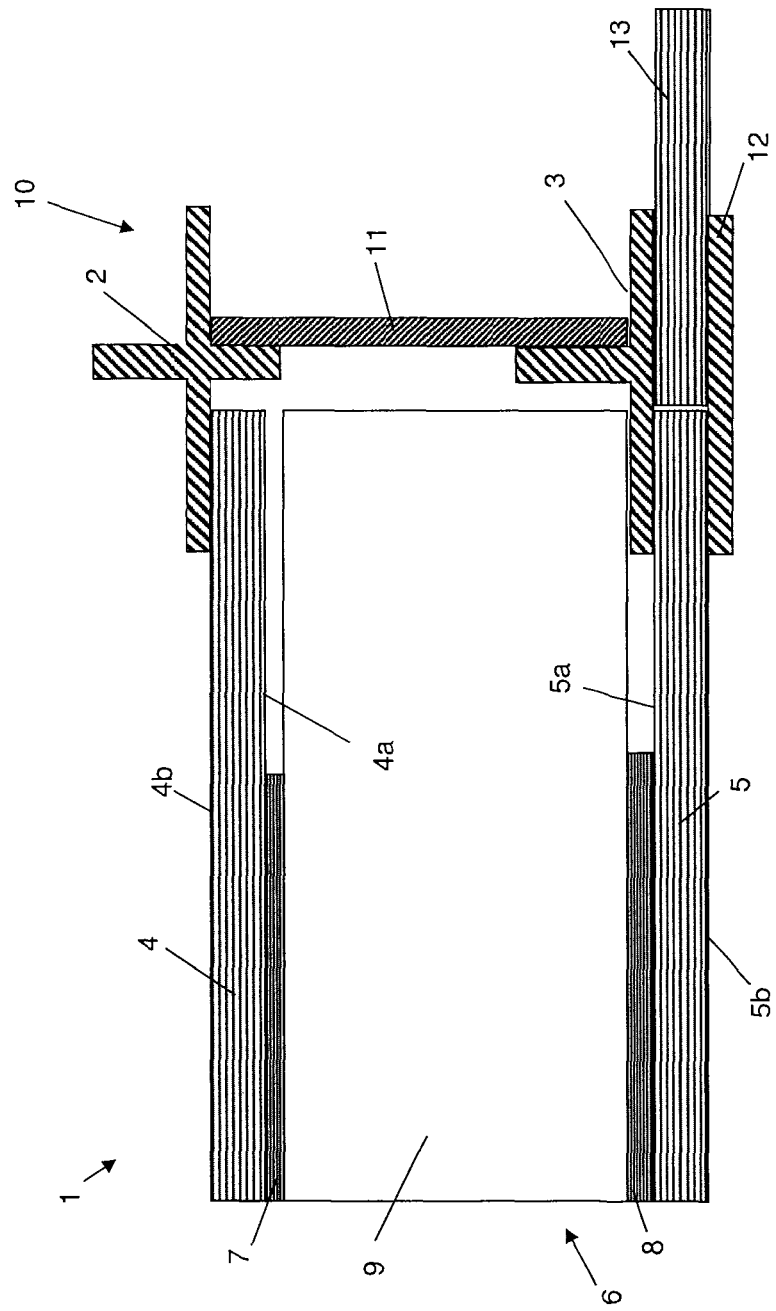
FIG. 1 is a cross-sectional schematic view of an aircraft root wing joint.

The thicknesses of the covers 20, 22 are not accurately controllable and can range from a lower tolerance value X (see FIG. 2a) to an upper tolerance value Y (see FIG. 2b). As explained above with respect to FIG. 1, these relatively large uncertainties in cover thickness are problematic at the aircraft wing root joint.

In order to manage the cover thickness tolerances in the region of the root joint, a stack 26 of uncured thickness control plies is laid up on the IMLs of the covers 20, 22 and the cover/thickness control ply assemblies are either co-cured, or the thickness control plies are co-bonded onto the cover during a further curing cycle. In all cases, the stack 26 has a ramped section 32 with a ramp 33 (that is, an inclined surface) where the thickness of the stack 26 decreases towards its outboard edge, and a flat section 34 towards its inboard edge. The ramped section 32 may be formed, for example, by laying up progressively shorter thickness control plies on top of one another or by selectively discontinuing internal plies. Referring to FIGS. 3a and 3b, the thickness of the cured panel assembly is first measured, and then if necessary some of the thickness control plies are removed from the stack 26 by a machining process. The number of plies which are removed will thus depend on the measured thickness. This results in machined and cured IML surfaces 36, 38 which are a known distance D from the OMLs 21, 23. The distance D is subject only to the tolerances of the machining and measuring processes, regardless of the thickness of the covers 20, 22. The tolerances involved in machining and measuring are typically far less than those involved in manufacturing CFRP covers 20, 22. Therefore, the distance D can be controlled with far greater accuracy than the thickness of the laminar composite covers 20, 22. Note that the stack 26 of thickness control plies extends along only a relatively small portion of the span of the wing close to its inboard edge, the span-wise length of the thickness control plies being determined by the stress allowable of the covers. This minimises both the size of the required machining tool and the weight of the added thickness control plies.

Figure 4:
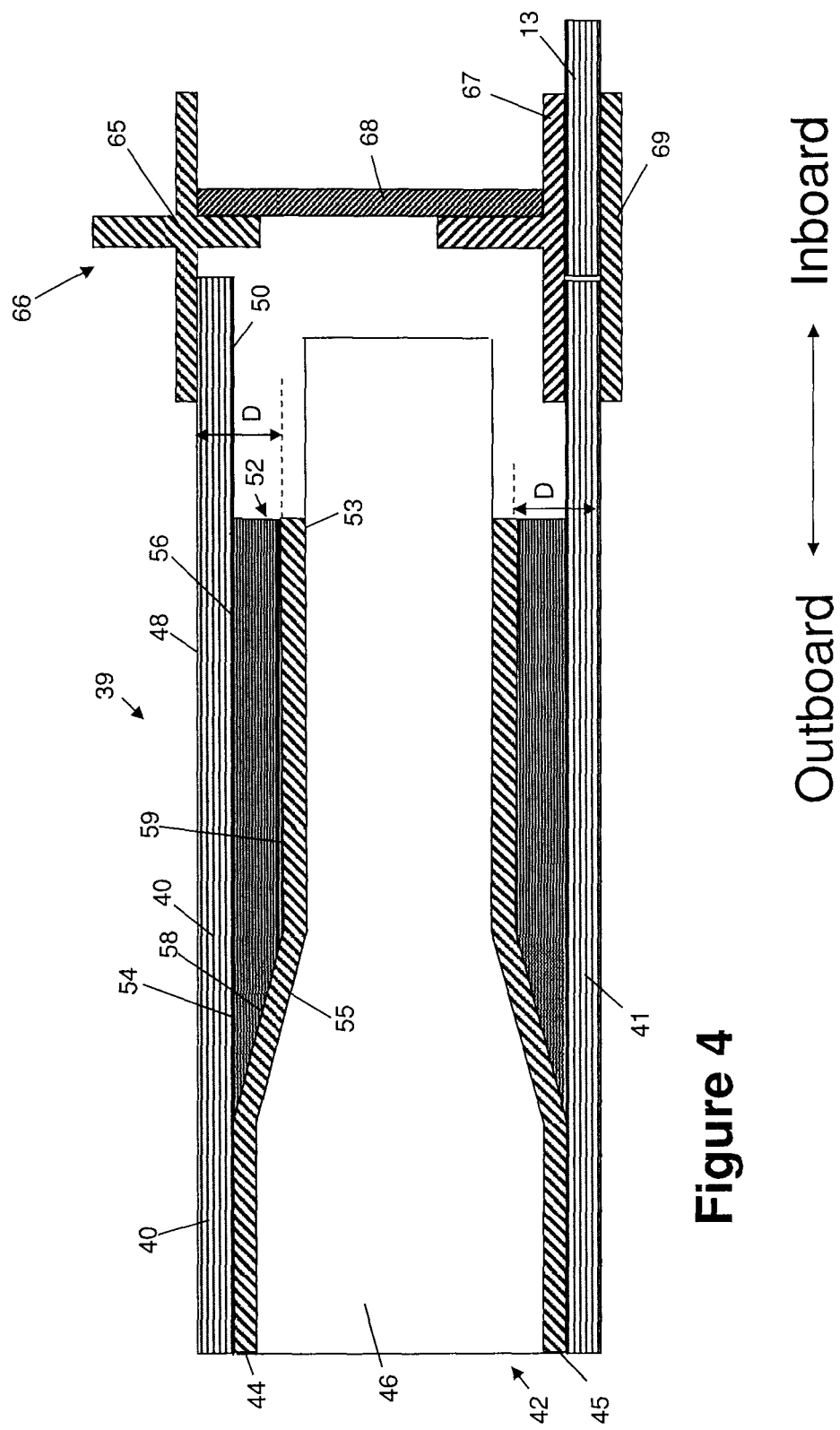
FIG. 4 is a cross-sectional schematic view of an aircraft root wing joint where the thicknesses of the wing box covers have been managed using the method illustrated by FIGS. 2, 3.

FIG. 4 shows a cross sectional schematic view of the root of an aircraft wing box 39. The wing box comprises upper and lower laminar composite covers 40, 41 which are bolted to a spar 42 which extends between them. Note that only the inboard root end of the spar and wing box is shown in FIG. 4. The spar 42 comprises upper and lower spar flanges 44, 45 extending from a spar web 46, and the flanges 44, 45 engage the upper and lower covers respectively. The spar flanges terminate outboard of the inboard edge of the spar web 46 to leave spar flange cutback areas where the covers overhang the flanges in an inboard span-wise direction. The covers 40, 41 have been manufactured by the process described above with reference to FIGS. 2a-3b. As the upper and lower covers (and the upper and lower spar flanges) are similar, only the upper cover (and the upper spar flange) will be described in detail.

The upper cover 40 has a moulded surface (OML) 48, a non-moulded surface (IML) 50 opposite the OML 48 and a stack 52 of thickness control plies co-bonded or co-cured to the IML 50 of the cover. The thickness of the stack 52 control plies has been controlled as described above to form a controlled EVIL surface 53 which is a precise distance D from the OML 48. The stack 52 consists of a ramped outboard section 54 with a ramp 55 where the thickness of the stack 52 decreases towards its relatively thin outboard edge, and a flat inboard section 56 which terminates at the same span-wise position as the spar flange 44. The spar web 46 converges at its inboard end, and the flange 44 is joggled to follow the line of the spar web and form a ramped surface 58 and a flat un-ramped surface 59. The ramp 58 in the spar flange engages the ramp 55 in the stack, and the un-ramped surface 59 of the spar flange engages the machined surface 53 of the stack 52. The covers and spar flanges are bolted together.

Still referring to FIG. 4, the upper and lower covers 40, 41 are also bolted to respective cruciform and tri-form root joint fittings 65, 67 of a centre wing box. The spar web 46 is attached to a spar web (not shown) of the centre wing box via a vertical buttstrap (also not shown).

The centre wing box also has a rib 68 (conventionally referred to as "rib one") connecting the upper and lower root joint fittings 65, 67. As the distance D between the inner and outer mould lines of the upper cover 40 can be controlled with close accuracy, the problem of gaps/clashes arising between the wing covers 40, 41 and the root joint fittings 65, 67 is greatly reduced (or even eliminated). As a result, the covers do not need to be bent significantly into shape during installation of the root joint, which means that fewer stresses and strains need to be tolerated by the covers. Thus, the covers 40, 41 can be made thinner and lighter. Similarly, as the distance D between the inner and outer mould lines of the lower cover can be closely controlled, the buttstrap 69 can be attached with less measuring and machining, thus improving the quality and reducing assembly time.

In the case illustrated in FIG. 4 (referring to the upper cover 40 but also applicable to the lower cover 41) the thickness of the cover is equal to its 'design value'—that is, the cover has a thickness which lies in the centre of a manufacturing tolerance range. Consequently, the outer mould line 48 forms a continuous flat aerodynamic surface, even in the ramped region.

Figure 5:
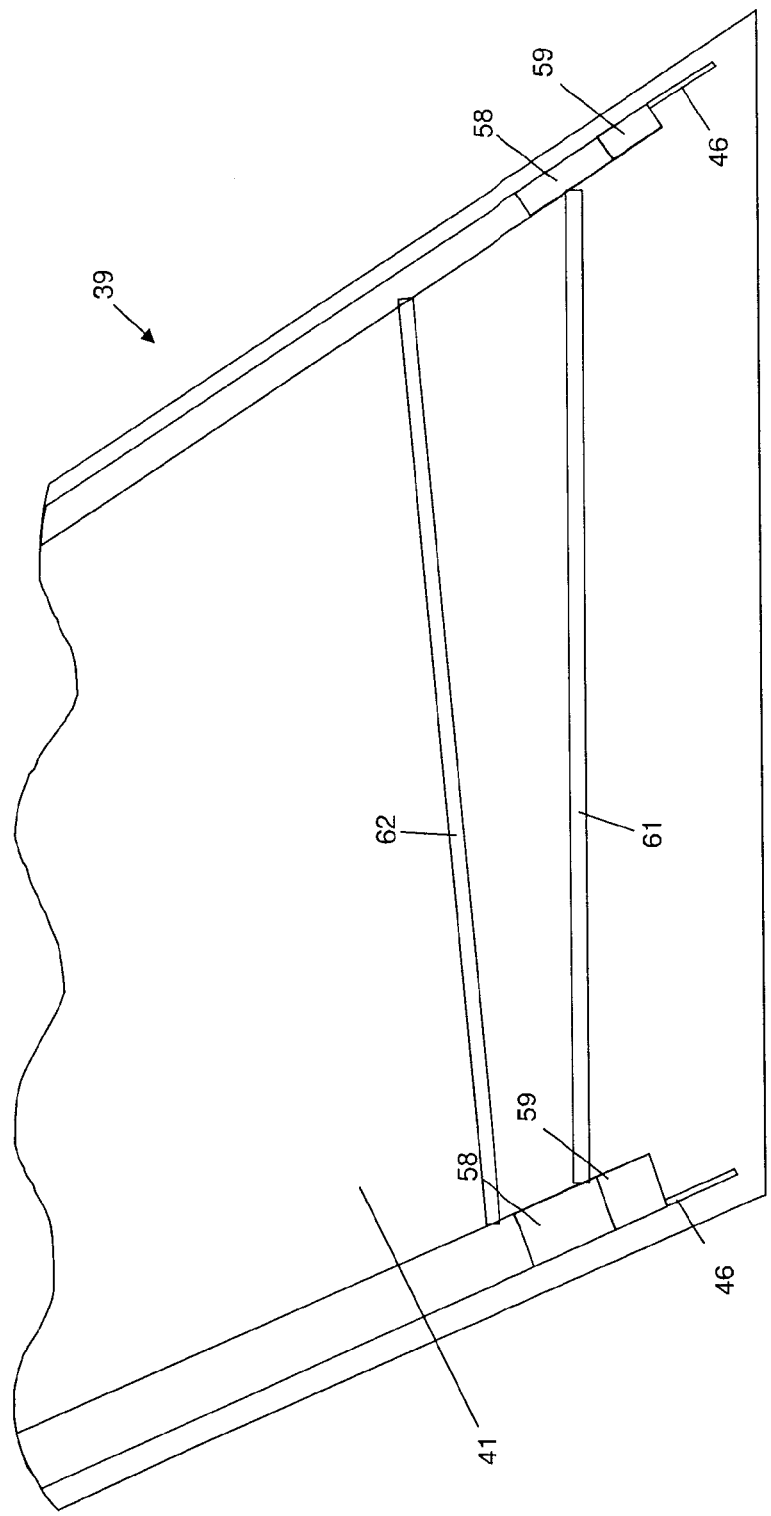
FIG. 5 is a perspective view of the wing box shown in FIG. 4.

FIG. 5 is a perspective view of the wing box 39 taken from above with the upper cover removed. FIG. 5 also shows ribs 61, 62 (conventionally referred to as "rib two" and "rib three" respectively) which connect the fore and aft spars of the wing box 39 as well as the upper and lower covers. The ribs 61, 62 are bolted to the upper and lower covers and to the webs 46 of the fore and aft spars.

Figure 6:
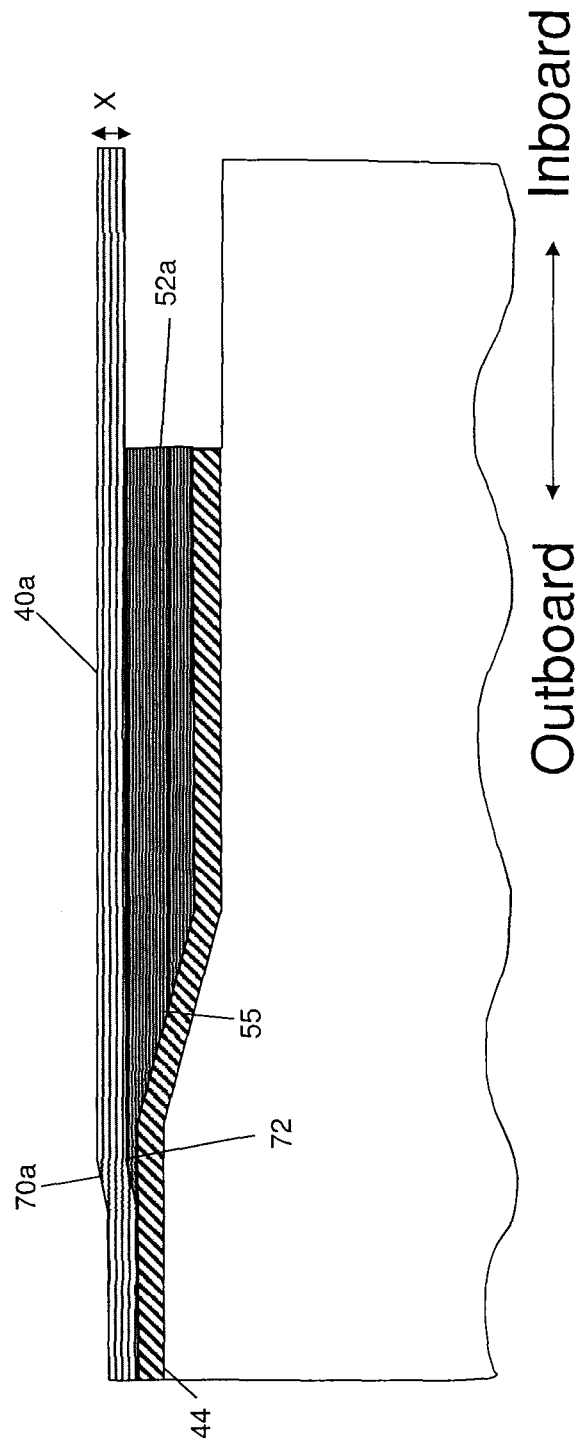
FIG. 6 is a cross-sectional schematic view of a cover to spar interface where the cover has a thickness at the lower end of a manufacturing tolerance.

FIG. 6 is similar to FIG. 4 and identical features are given the same reference numerals. Note that the lower cover has been omitted for clarity. In this case, the thickness of the cover 40a is equal to the lower tolerance value X (see FIG. 2a). In order to achieve the required value of D, the thickness of the stack 52a of thickness control plies is greater than the thickness of the (machined) stack 52 shown in FIG. 4. When the cover 40a and the stack 52a of thickness control plies are bolted to the spar, the portion of the cover outboard of the stack 52a is bent down towards the upper spar flange 44. This creates a joggled section 70a in the cover 40a which is inclined in the opposite sense to the ramp 55 in the stack of thickness control plies.

The angle of inclination of the ramp in the joggled section 70a is typically very shallow (i.e. within the bending allowables) and has little effect on the aerodynamic performance of the wing. Note that the angle of the joggled section 70a shown in FIG. 6 is exaggerated for clarity.

Figure 7:
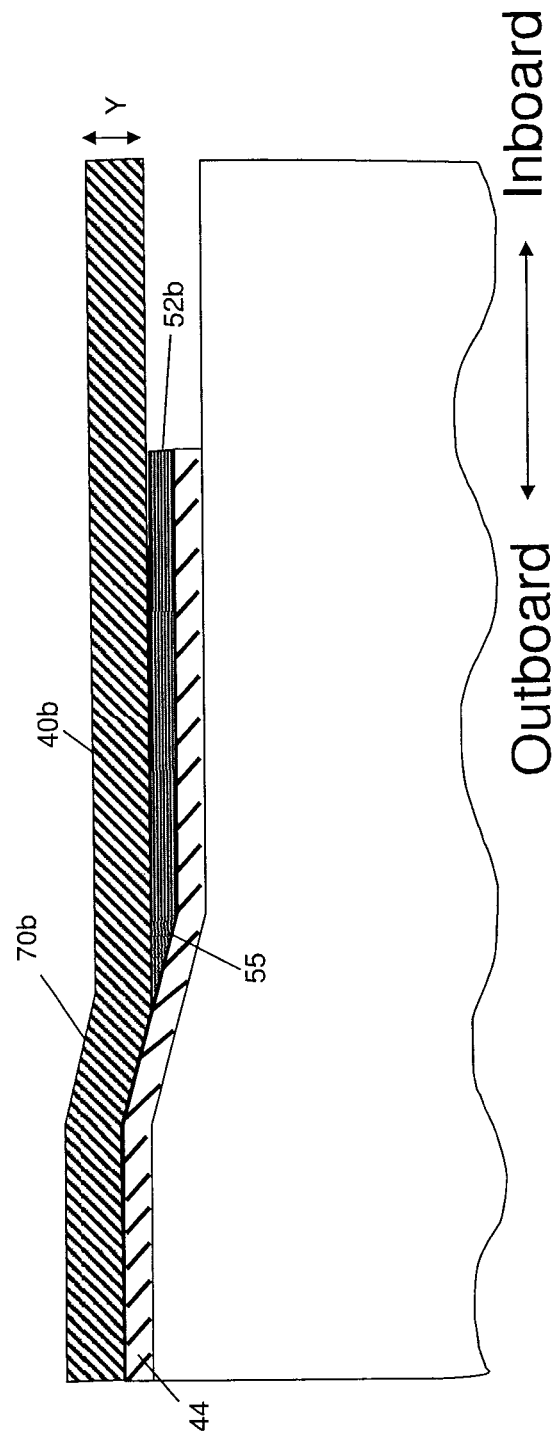
FIG. 7 is a similar view to FIG. 6 but where the cover has a thickness at the upper end of a manufacturing tolerance.

FIG. 7 is similar to FIGS. 4, 6 and identical features will be given the same reference numerals. Note that the lower cover has again been omitted for clarity. In this case the thickness of the cover 40b is equal to the upper tolerance value Y (illustrated in FIG. 2b). When the cover 40b and the stack 52b of thickness control plies are bolted to the spar, the portion of the cover outboard of the stack 52b is bent up to create a joggled section 70b with a ramp which is inclined in the same sense as the ramp in the stack of thickness control plies. The ramp in the joggled cover engages the top of the ramp in the spar flange.

The ramp in the joggled section 70b is typically very shallow (i.e. within the bending allowables) and has little effect on the aerodynamic performance of the wing. Again, no shimming is required, which saves time and complexity. Note that, again, the angle of the joggled section 70b shown in FIG. 7 is exaggerated for clarity. Note also that the joggle has a downward inboard incline as opposed to the upward inboard incline of the joggled section 70a shown in FIG. 6.

As noted above, in each case the stacks 52, 52a, 52b decrease in thickness towards their outboard edges. Alternatively, the stacks 52, 52a, 52b may decrease in thickness towards their inboard edges (i.e. the edges proximate the inboard edges of the covers 40, 40a, 40b). In this case, the height of the spar web would be matched accordingly with the stacks.

In the method described above, the thickness of the cured panel assembly is first measured, and then if necessary some of the thickness control plies are removed from the stack 26 by a machining process. In an alternative case in which the thickness control plies are bonded to a previously cured cover, then the thickness of the cured cover may be measured before the thickness control plies are bonded in place, and the number of thickness control plies selected in accordance with the measured thickness (either by peeling off some of the uncured plies in a pre-prepared stack, or by laying up the stack with exactly the right number of plies). Thus in this case it is not necessary to machine away some of the cured thickness control plies after they have been bonded to the cover.

Although the invention has been described above with reference to one or more preferred embodiments, it will be appreciated that various changes or modifications may be made without departing from the scope of the invention as defined in the appended claims.

The invention claimed is:

1. A method of manufacturing a structure, the method comprising:
   a) forming a panel assembly by bonding a stack of thickness control plies of composite material to a laminar composite panel, the stack of thickness control plies having a first edge proximate an edge of the laminar composite panel, a second edge opposite the first edge, and a ramp where the thickness of the stack of thickness control plies decreases towards the first or second edge;
   b) measuring the thickness of the laminate composite panel or the panel assembly;
   c) controlling the number of thickness control plies in accordance with the measured thickness;
   d) attaching a first component to the panel assembly, the first component having a surface which engages the laminar composite panel and a ramp which engages the ramp in the stack of thickness control plies; and
   e) attaching the laminar composite panel at or near its edge to a further component.

2. The method of claim 1 wherein the number of thickness control plies is controlled in step c) by removing one or more of the plies from the stack of thickness control plies either before or after the stack of thickness control plies has been bonded to the laminar composite panel in step a).

3. The method of claim 2 wherein the thickness of the panel assembly is measured in step b), and the number of thickness control plies is controlled in step c) by removing one or more of the plies from the stack of thickness control plies after the stack of thickness control plies has been bonded to the laminar composite panel in step a).

4. The method of claim 1 wherein the thickness of the laminar composite panel is measured in step b), and the number of thickness control plies is controlled in step c) by selecting the number of plies in the stack of thickness control plies before it is bonded to the laminar composite panel in step a).

5. The method of claim 1 wherein the thickness of the stack of thickness control plies decreases towards the second edge.

6. The method of claim 1 further comprising bending the laminar composite panel after step a) to form a ramp in the laminar composite panel.

7. The method of claim 6 wherein the ramp is inclined in the opposite sense to the ramp in the stack of thickness control plies.

8. The method of claim 6 wherein the ramp in the laminar composite panel is inclined in the same sense as the ramp in the stack of thickness control plies, and wherein the ramp in the laminar composite panel engages the ramp in the first component.

* * * * *